J. WOLNY.
CAR DOOR OPERATOR.
APPLICATION FILED JUNE 5, 1916.

1,204,630.

Patented Nov. 14, 1916.

Inventor
J. Wolny

By A. M. Wilson

Attorney

UNITED STATES PATENT OFFICE.

JOSEPH WOLNY, OF CARNEYVILLE, WYOMING.

CAR-DOOR OPERATOR.

1,204,630.  Specification of Letters Patent.  Patented Nov. 14, 1916.

Application filed June 5, 1916. Serial No. 101,740.

*To all whom it may concern:*

Be it known that I, JOSEPH WOLNY, a subject of the Emperor of Austria-Hungary, residing at Carneyville, in the county of Sheridan and State of Wyoming, have invented certain new and useful Improvements in Car-Door Operators, of which the following is a specification.

This invention relates to certain new and useful improvements in car door operators.

The primary object of the present device is the provision of a ratchet operating means for a car door elevating device and whereby the vertically movable door may be readily elevated when desired by a trainman stationed adjacent the track upon which the car is positioned.

A further object of the device is to provide a vertically movable door such as a grain door for a car with an operating shaft journaled beneath the car and provided upon its projcting end with a ratchet mechanism whereby the shaft may be manually revolved for elevating the door to its open position whenever desirable.

With these general objects in view and others that will appear as the nature of the invention is better understood, the same consists in the novel construction, combination and arrangement of parts hereinafter more fully described, illustrated in the accompanying drawings, and then claimed.

Figure 1:
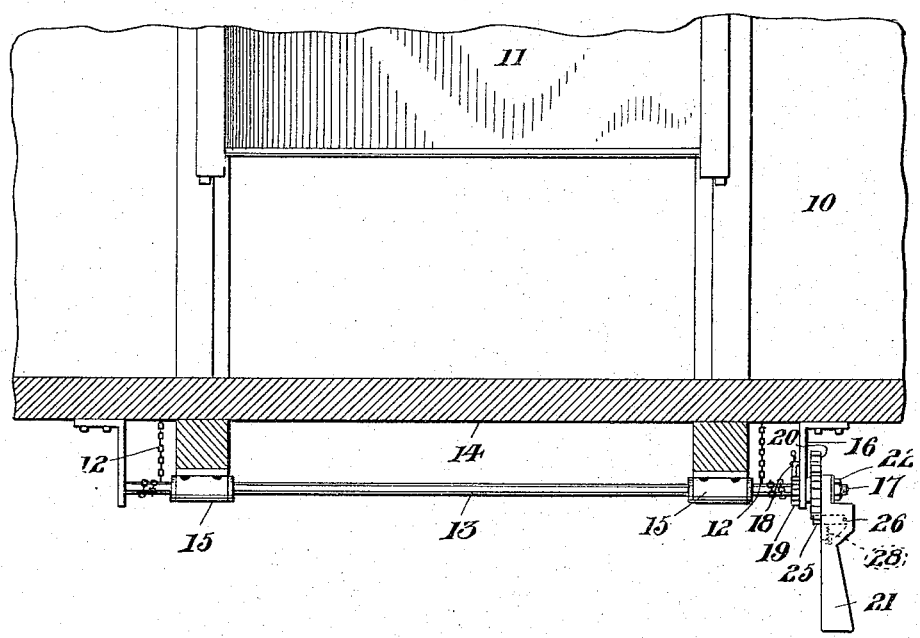
Figure 2:
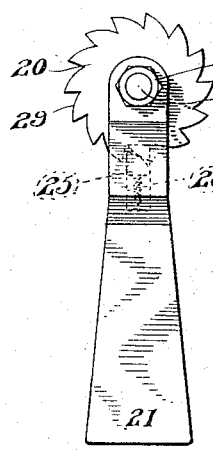
Figure 3:
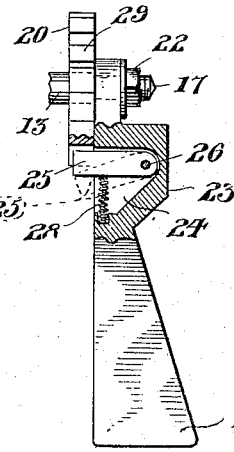
Figure 4:
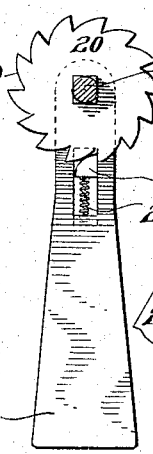
Figure 5:
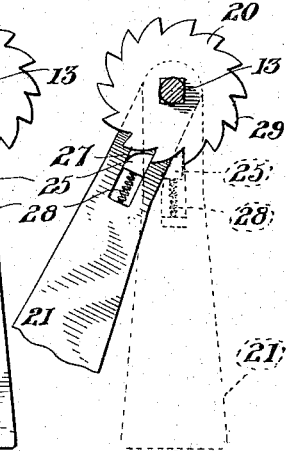

In the drawings forming a part of this application and in which like designating characters refer to corresponding parts throughout the several views, Figure 1 is an elevational view of a portion of a car provided with a door having the present operating means. Fig. 2 is a front elevation of the ratchet driving means. Fig. 3 is a side elevation partially broken away. Fig. 4 is a rear elevation of the same normally positioned, and, Fig. 5 is a view similar to Fig. 4 showing the operating member shifted for actuation, the normal position of the latter being indicated by dotted lines.

The present device is illustrated in connection with the car 10 having a vertically movable door 11 operable by chains 12 secured to an operating shaft 13 beneath the floor 14 of the car by means of bearings 15.

Each end portion of the shaft 13 is journaled in an angular depending bracket 16 carried by the bottom 14 while one end of the shaft 17 projects through the adjacent bracket 16 and is provided with a spring-pressed dog 18 adapted to engage a toothed wheel 19 upon the shaft 13 and whereby the shaft is prevented from allowing the chains 12 to unwind therefrom until the dog 18 is released.

A ratchet wheel 20 is secured to the shaft end 17 outwardly of the adjacent bracket 16 while an operating lever 21 is journaled upon said shaft end 17 outwardly of the ratchet wheel 20 and is maintained thereon by means of the nut 22. The lever 21 is of a weighted construction being of substantially truncated pyramidal form and is provided with a housing 23 having a recess 24 therein opening at the inner face of the lever while a pawl 25 is pivoted upon a pin 26 within the recess 24.

The free end of the pawl 25 projects outwardly of the recess 24 and is provided with one curved face 27 upon its side adjacent the ratchet wheel 20 which face is maintained in normal contact with the said wheel by means of a coil spring 28 positioned within the recess 24 and bearing against the pawl 25.

The complete operation of the device will be at once apparent from this detailed description thereof, it being noted that the lever 20 is of weighted construction maintaining the same normally in a vertical depending position and at which times the pawl 25 is in engagement with one of the teeth 29 of the ratchet wheel 20. By swinging the lever 21 in the direction as indicated in Fig. 5 of the drawing, the pawl 25 takes hold of the ratchet wheel 20 engaging one of the teeth 29 thereof and whereby a swinging of the lever 21 to the dotted line position illustrated in Fig. 5 revolves the ratchet wheel 20 and the shaft 13 in the proper direction for winding up the chains 12 and elevating the door 11. By releasing the dog 18 from the wheel 19, the shaft 13 is released, allowing the door 11 to descend to its closed position of its own weight unwinding the chains 12 from the shaft 13, during which movement of the shaft 13 the ratchet wheel 20 is turned with its teeth 29 freely passing over the curved face 21 of the pawl 25.

The operating shaft 13 is desirably positioned in close proximity beneath the car bottom 14 rendering the employment of the usual turn crank for the shaft impractical so that the present pawl and ratchet operrating device is especially serviceable for the present arrangement.

While the forms of the invention now set forth are believed to be preferable, it will be understood that minor changes may be made if desired falling within the spirit and scope of the appended claims.

What I claim as new is:—

1. A shaft actuating device for a car door elevator comprising in combination with a winding shaft, a toothed ratchet wheel secured thereon, a normal depending weighted lever journaled upon the said shaft adjacent the said wheel and having a housing provided with a recess opening at the face thereof adjacent the said wheel, a pawl pivoted at one end adjacent the bottom of the said recess and projecting outwardly thereof in the path of movement of the teeth of the said wheel and having one curved face in wiping contact with such teeth during the shifting of the lever in one direction, and a tensioning spring within said recess engaging the said pawl.

2. A device of the class described comprising in combination with a grain door of a car having an elevating shaft horizontally journaled beneath in close proximity to the car bottom, an angular bracket carried by the said bottom through which the said shaft extends, a toothed wheel upon the said shaft at one side of the said bracket, a pivoted dog upon said bracket normally engaging the said wheel, a toothed ratchet wheel upon the said shaft at the opposite side of the said bracket from the said dog, an operating lever of substantially truncated pyramidal form journaled upon the said shaft outwardly of the said ratchet wheel, a retaining nut upon the said shaft outwardly of the said lever, said lever having a housing portion provided with a recess opening adjacent the said ratchet wheel, a spring-pressed pawl pivoted at one end adjacent the bottom of the said recess at the upper end thereof and resiliently positioned with its free end projecting outwardly of the said recess within the path of movement of the teeth of the said ratchet wheel.

In testimony whereof I affix my signature.

JOSEPH WOLNY.

Copies of this patent may be obtained for five cents each, by addressing the "Commissioner of Patents, Washington, D. C."